(No Model.)

D. E. McKEE.
Wagon Brake.

No. 240,160.  Patented April 12, 1881.

Witnesses
Geo. H. Strong
Frank A. Brooks

Inventor
David E. McKee
By Dewey & Co.
Attys

UNITED STATES PATENT OFFICE.

DAVID E. McKEE, OF POTTER VALLEY, CALIFORNIA.

WAGON-BRAKE.

SPECIFICATION forming part of Letters Patent No. 240,160, dated April 12, 1881.

Application filed January 28, 1881. (No model.)

*To all whom it may concern:*

Be it known that I, DAVID E. McKEE, of Potter Valley, county of Mendocino, State of California, have invented an Improved Wagon-Brake; and I hereby declare the following to be a full, clear, and exact description thereof.

My invention relates to an improvement in wagon-brakes; and it consists in so constructing the brake that it may be operated by the weight of the wagon-bed and load, as is more fully described in the accompanying drawings, in which—

Figure 1:
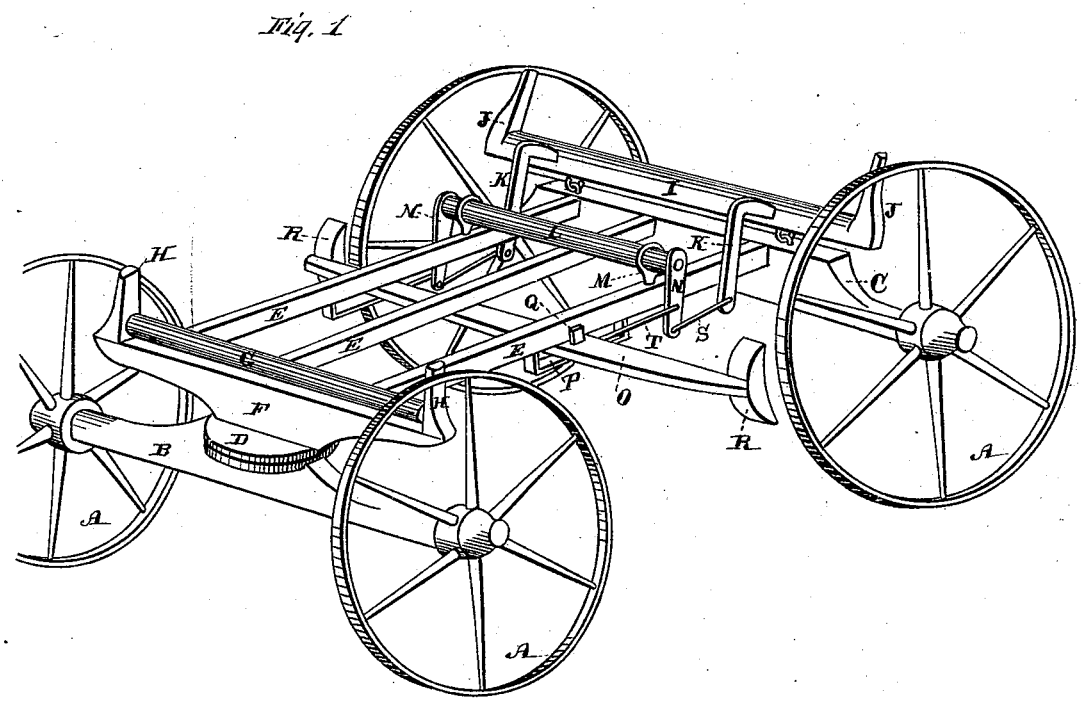
Figure 2:
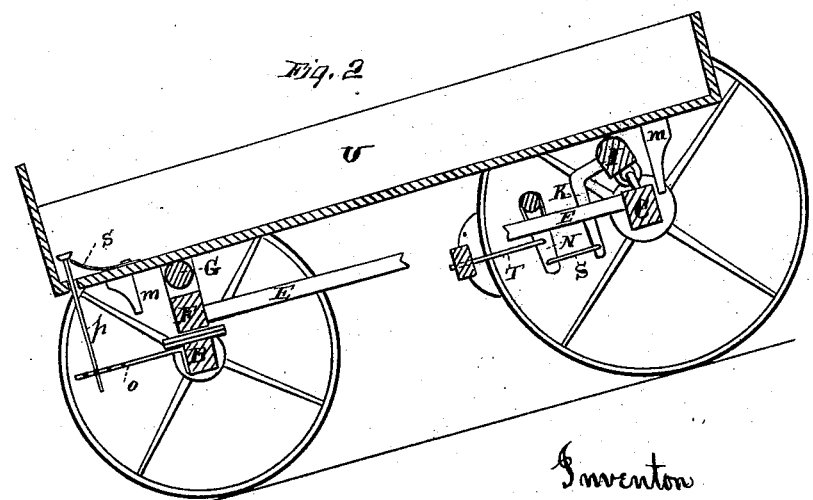

Figure 1 is a perspective view. Fig. 2 is a longitudinal section.

Let A represent the wheels of a wagon, B the front axle, and C the rear axle, the front axle, B, having the turn-table D and the head-block or bolster F, to which are fastened the reaches or connecting-frame E, which, being fastened to the rear axle, C, thus secure the two axles together.

On the bolster or head-block F is the roller G, its ends being pivoted or journaled to standards H, as shown.

To the top of the rear axle, C, is hinged the rocking bar I, having its ends provided with standards J, between which the body of the wagon rests upon the bar I. The bar I is hinged to the axle C, so as to have a forward or backward rocking motion on the axle. From its forward side extend the levers K, bent downward on either side of the reaches E, and extending below them. Across the top of the reaches E, a little in front of the rear axle, C, is the movable piece or roller L, journaled in staples M, so as to revolve freely and securely upon the top of the frame. The ends of the roller L are provided with downwardly-projecting arms or cranks N.

O is the brake beam or bar, sliding under the connecting-frame E, and supported in any usual manner, (here shown by braces P,) and secured laterally by pins or lugs Q, so that it may not slip from side to side. On its ends are the ordinary braking blocks or shoes R, to be forced against the rear wheels.

The bent levers K and the arms or cranks N are connected by the rods S, through their lower ends, and loosely pivoted therein, so as to give freedom of movement. The arms N and the brake-beam O are connected by the rods T. When the bar I is rocked on its hinges the levers K move the arms or cranks N back and forth, which thus operate the brakes R and cause them to press against the wheels.

When the body U is put on the wagon it rests upon the rear bar, I, and forward roller, G, and between the standards J and H, and is secured by staples, or otherwise, to the standards J, which move with the bar I. Now, when the wagon is going down hill, the weight of the body U, with or without a heavy load, will cause it to slip forward, the roller G permitting, and will draw the standards J with it, thus putting on the brakes.

These brakes, being on the running-gear, can be used for any wagon simply by changing the bed. Suitable attachments can be made to prevent the bed from going too far back or forward. I have here shown for this purpose the stops or projections m attached to the sides of the wagon-bed, the forward ones being placed in front of the forward bolster to prevent the bed from slipping too far back, and the rear ones behind the rear bolster to prevent the bed from slipping too far forward. These stops would be sufficient on ordinary roads, but on heavy roads a further stop is necessary.

Attached to the bolster F, and projecting in front thereof, is the arm o, provided with a series of holes, as shown. A rod or bolt, p, extends downward from the foot-board in front of the wagon-bed, and is forced into the holes in the arm o by placing the foot upon it. A spring, s, holds the rod p up out of the holes when not needed. Thus the wagon-bed is locked, and prevented by the rod p from pitching forward.

Having thus described my invention, what I claim as new, and desire to secure by Letters Patent, is—

1. In combination with a wagon-frame, the roller G, rocking bar I, with its standards J and bent levers K, the roller or piece L, with its arms or cranks N, and braking-beam O, with its brakes R, substantially as described.

2. In combination with the body U, the roller G, and rocking bar I, with its standards J, to which the body U is secured, said bar I being so connected with the brakes R that the body U, in slipping forward and moving the bar I, will operate said brakes, substantially as described.

3. The rocking bar I, mounted upon the rear axle, C, and so connected with the wagon-body U as to be moved by it backward or forward, said bar I having the bent levers K, which are connected, either directly or indirectly, with the brake-beam O, so that the forward or backward movement of the rocking bar I will apply or release the brakes, substantially as herein described.

4. In combination with the body U, arranged to have a forward and backward motion, as hereinbefore shown, the locking device consisting of the arm $o$, adapted to receive the rod or bolt $p$ in front of the body U, whereby the bed or body is prevented from pitching forward, substantially as described.

In witness whereof I have hereunto set my hand.

DAVID E. McKEE.

Witnesses:
G. B. HOPPER,
B. P. WHITNY.